(12) United States Patent
Bondu

(10) Patent No.: US 8,365,785 B2
(45) Date of Patent: Feb. 5, 2013

(54) HEAVY GOODS VEHICLE TIRE

(75) Inventor: Lucien Bondu, La Roche Noire (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 703 days.

(21) Appl. No.: 12/446,455

(22) PCT Filed: Oct. 5, 2007

(86) PCT No.: PCT/EP2007/060616
§ 371 (c)(1),
(2), (4) Date: Apr. 20, 2009

(87) PCT Pub. No.: WO2008/046749
PCT Pub. Date: Apr. 24, 2008

(65) Prior Publication Data
US 2010/0314018 A1 Dec. 16, 2010

(30) Foreign Application Priority Data
Oct. 18, 2006 (FR) ...................................... 06 09342

(51) Int. Cl.
*B60C 9/18* (2006.01)
(52) U.S. Cl. ........................................ 152/532; 152/537
(58) Field of Classification Search .................. 152/526, 152/531, 532, 535, 537, 538
See application file for complete search history.

(56) References Cited

U.S. PATENT DOCUMENTS

| | | | | |
|---|---|---|---|---|
| 4,062,393 A | * | 12/1977 | Bertrand | 152/532 |
| 4,349,061 A | * | 9/1982 | Hirakawa et al. | 152/209.5 |
| 5,996,662 A | * | 12/1999 | Cluzel | 152/531 |
| 6,536,496 B1 | * | 3/2003 | Bondu | 152/532 |
| 6,640,861 B2 | * | 11/2003 | Pereira et al. | 152/532 |
| 6,776,205 B2 | * | 8/2004 | Pereira et al. | 152/532 |
| 2006/0032570 A1 | * | 2/2006 | Callamand et al. | 152/532 |
| 2006/0180257 A1 | * | 8/2006 | Gervais et al. | 152/532 |

FOREIGN PATENT DOCUMENTS

| | | | |
|---|---|---|---|
| EP | 1 439 204 A | | 7/2004 |
| EP | 1439204 A2 | * | 7/2004 |
| FR | 2 222 232 A1 | | 10/1974 |
| FR | 2222232 A | * | 11/1974 |
| FR | 2 499 912 A1 | | 8/1982 |
| FR | 2499912 A | * | 8/1982 |
| FR | 2 754 769 A1 | | 4/1998 |
| FR | 2754769 A1 | * | 4/1998 |
| FR | 2 774 333 A1 | | 8/1999 |
| FR | 2774333 A1 | * | 8/1999 |

* cited by examiner

*Primary Examiner* — Joseph Del Sole
*Assistant Examiner* — Ryan Ochylski
(74) *Attorney, Agent, or Firm* — Cozen O'Connor

(57) ABSTRACT

A tire with a crown reinforcement that comprises at least three plies of reinforcing elements. At least a first profiled element P1 has an axially outer end that is situated at a distance from the equatorial plane of the tire which is less than the distance separating the plane from the end of a second ply. The profiled element P1 is radially separated from the radially outer liner C1 of a first ply by a second profiled rubber compound element G1. At least a third profiled element P2 has an axially outer end that is situated at a distance from the equatorial plane of the tire which is less than the distance separating the plane from the end of a third ply. The profiled element P2 is radially separated from the radially inner liner C2 of the first ply by a fourth profiled rubber compound element G2. The profiled rubber compound elements P1, P2 and G1, G2 and the liners C1, C2 have respective tensile secant moduli of elasticity at 10% elongation MP1, MP2, MG1, MG2, MC1, MC2 such that $MC1 \geq MG1 > MP1$ and $MC2 \geq MG2 > MP2$.

9 Claims, 2 Drawing Sheets

000# HEAVY GOODS VEHICLE TIRE

RELATED APPLICATIONS

This is a U.S. National Phase Application under 35 USC 371 of International Application PCT/EP2007/060616, filed on Oct. 5, 2007.

This application claims the priority of French patent application no. 06/09342 filed Oct. 18, 2006, the subject matter of which is hereby incorporated by reference.

FIELD OF THE INVENTION

The present invention relates to a tire with a radial carcass reinforcement and more particularly to a tire intended to equip vehicles carrying heavy loads, such as a transport vehicle, for example lorries, tractors, trailers or buses and coaches, or a "civil engineering" vehicle.

BACKGROUND OF THE INVENTION

Such a tire, generally intended to bear heavy loads, comprises a radial carcass reinforcement and a crown reinforcement which is composed of at least two working crown plies formed by inextensible reinforcing elements crossed from one ply to the next and forming equal or unequal angles, between 10 and 45°, with the circumferential direction.

The crown reinforcements of radial tires, more particularly with regard to tires having very large dimensions, are subjected to large deformations which give rise to longitudinal and transverse shear stresses between the edges of two plies (the longitudinal shear is greater than the transverse shear when the cords of crossed plies form small angles with the circumferential direction) at the same time as a delaminating stress, a radial stress tending to radially separate the edges of the two plies. The said stresses are due firstly to the tire inflation pressure, which has the effect that the so-called belt pressure between the carcass reinforcement and crown reinforcement tends to cause the circumferential expansion of the said crown reinforcement; the said stresses are also due to the load borne by the running tire when a contact area is established between the ground and tire; the said stresses are additionally due to the drifting of the running tire. These stresses produce cracks in the rubber compound adjoining the end of the shortest ply, these cracks propagating through the said compound and being detrimental to the durability of a crown reinforcement, and hence of the tire.

A clear improvement in the durability has been provided by using in the crown reinforcement at least one protective crown ply having an axial width greater than the width of the axially widest working ply.

In the case of a tire for "heavy goods" vehicles, a single protective ply is generally present and its protective elements are, in most cases, oriented in the same direction and with the same angle in absolute value as those of the reinforcing elements of the radially outermost, and hence radially adjacent, working ply. In the case of civil engineering tires intended for running over more or less uneven ground, the presence of two protective plies is advantageous, the reinforcing elements being crossed from one ply to the next.

Cords are termed inextensible when the said cords have, under a tensile force equal to 10% of the breaking force, a relative elongation at most equal to 0.2%.

Cords are termed elastic when the said cords have, under a tensile force equal to the breaking load, a relative elongation at least equal to 4%.

The circumferential direction of the tire, or longitudinal direction, is the direction corresponding to the periphery of the tire and defined by the running direction of the tire.

The transverse or axial direction of the tire is parallel to the axis of rotation of the tire.

The radial direction is a direction intersecting the axis of rotation of the tire and perpendicular thereto.

The axis of rotation of the tire is the axis around which it rotates during normal use.

A radial or meridian plane is a plane which contains the axis of rotation of the tire.

The circumferential mid-plane, or equatorial plane, is a plane perpendicular to the axis of rotation of the tire that divides the tire into two halves.

Under certain running conditions, the stresses prevail at the crown reinforcement, more particularly the shear stresses between the crown plies, and, combined with a significant rise in the operating temperature at the ends of the axially narrowest crown plies, result in the appearance and propagation of cracks in the rubber at the said ends, this in spite of the presence of a thickened rubber layer at the junction of the edges of working crown plies.

In order to overcome the above disadvantages and improve the durability of the crown reinforcement of the studied tire type, a number of prior patents claim solutions relating to the structure and quality of the layers and/or profiled elements of rubber compounds which are arranged between and/or around the ends of plies and more particularly the ends of the axially shortest ply.

Patent FR 1 389 428, with the aim of improving the resistance to degradation of the rubber compounds situated in the vicinity of the crown reinforcement edges, recommends the use, in combination with a tread of low hysteresis, of a profiled rubber element covering at least the sides and the marginal edges of the crown reinforcement and composed of a rubber compound with low hysteresis.

Patent FR 2 222 232, with the aim of avoiding separations between crown reinforcement plies, teaches coating the ends of the reinforcement in a pad of rubber, the Shore A hardness of which differs from that of the tread surmounting the said reinforcement and is greater than the Shore A hardness of the profiled rubber compound element arranged between the edges of crown reinforcement plies and the carcass reinforcement.

U.S. Pat. No. 5,154,217 uses a different unit of measurement and claims arranging between the ends of two plies, in the continuation of the ply contained between the said two plies, a cushion of rubber compound whose modulus of elasticity at 100% elongation is greater than the same modulus of the tread.

To join the two respective edges of two crown reinforcement plies, Patent FR 2 298 448 describes the use of so-called shearing rubbers between the said edges having a high Shore A hardness and high modulus of elasticity at 100%, this use being combined with the use of strips of anisotropic rubber arranged between the edges of the crown reinforcement and the carcass reinforcement.

The same applies in the case of joining the crown reinforcement plies described in Patent FR 2 499 912, the lateral part of the rubber layer arranged between the two main plies of the crown reinforcement being composed of a rubber compound having a high Shore hardness.

In Patent EP 1 062 106, the Applicant proposed a tire whose crown reinforcement comprises at least two plies of reinforcing elements, in which tire the edge of the axially narrowest ply is separated from the axially widest ply by a profiled rubber to compound element, the axially outer end of which is situated at a distance from the equatorial plane of the tire which is at least equal to the distance separating the said plane from the end of the widest ply, and the said profiled element being itself separated from the narrowest liner of the ply by an edging rubber, the said profiled element, the said edging rubber and the said liner having respective tensile secant moduli of elasticity at 10% relative elongation such that they decrease radially inwardly from the liner to the profiled element.

It has been found that the various structures listed above did not provide a completely satisfactory solution under highly punishing running conditions for the tire.

Another solution such as described in Patent FR 2 421 742 involves more favorably distributing the stresses which give rise to separation between working crown plies, following the drifting of the tire, by multiplying the number of working plies.

Multiplying the working plies is not without drawbacks, particularly at the centre of the crown reinforcement where the number of plies has a direct influence on the flexural rigidity of the crown of the tire. When this rigidity increases, it follows that impacts occurring on the crown of the tire, such as, in particular, when passing over large-sized stones, can lead to irreparable damage to the tire on account of this increased rigidity.

Patent Application WO 00/54992 has additionally proposed, with the aim of avoiding these drawbacks, producing a working crown reinforcement composed of at least three continuous working plies and of at least one half-ply, on each side of the circumferential mid-plane, which is arranged between the edges of at least two radially adjacent continuous working plies and whose distinguishing feature is particularly that it presents an angle with the circumferential direction that is greater than 25° and greater by a quantity of between 5° and 15° than the largest of the angles of the continuous working plies. The results obtained with this type of architecture were wholly satisfactory for the tested tire sizes.

The tests carried out with tires of this type show that, in light of the current requirements with regard to the considered applications, it may still be necessary to improve the performance of the tires particularly in terms of durability.

SUMMARY OF THE INVENTION

One object of the present invention is to provide tires intended to equip vehicles carrying heavy loads that have increased durability over the known tires and make it possible in particular to limit the appearance and propagation of cracks in the rubber compositions, in the vicinity of the ends of crown plies, whatever the running conditions.

This object has been achieved according to an aspect of the invention by a tire with a radial carcass reinforcement surmounted by a crown reinforcement comprising at least three plies of reinforcing elements which are parallel to one another in each ply, at least the axially outer end of a first ply being radially opposite a second ply situated radially more inwardly, and radially opposite a third ply situated radially more outwardly, at least a first profiled rubber compound element P1 radially separating the second ply from at least the end of the first ply, the axially outer end of the first profiled element P1 being situated at a distance from the equatorial plane of the tire which is less than the distance separating the plane from the end of the second ply, the profiled element P1 being radially separated from the radially outer liner C1 of the first ply by a second profiled rubber compound element G1, at least a third profiled rubber compound element P2 radially separating the third ply from at least the end of the first ply, the axially outer end of the third profiled element P2 being situated at a distance from the equatorial plane of the tire which is less than the distance separating the plane from the end of the third ply, the profiled element P2 being radially separated from the radially inner liner C2 of the first ply by a fourth profiled rubber compound element G2, and the profiled rubber compound elements P1, P2 and G1, G2 and the liners C1, C2 having respective tensile secant moduli of elasticity at 10% elongation MP1, MP2, MG1, MG2, MC1, MC2 such that MC1≧MG1>MP1 and MC2≧MG2>MP2.

The combination of the various rubber compound layers P1, P2 and G1, G2 through the choice of their respective moduli of elasticity MP1, MP2 and MG1, MG2 allows an improvement in the resistance of the crown architecture to separation between the ends of the working plies. Specifically, the presence of these rubber compound layers appears to make it possible, on account of the resultant uncoupling of the plies, to protect the end of the first ply and thus prevent or at the very least delay the appearance and/or the propagation of cracking in the rubber compositions.

The stacking of two profiled rubber compound elements on either side of the said end, creating on either side gradients of moduli of elasticity which decrease from the liners of the said end to each of the plies radially opposite the said end, appears in fact to enable the tire to better withstand the stresses to which it can be subjected and thus improve its performance in terms of durability under particularly harsh running conditions.

According to a particularly advantageous embodiment of the invention, the thicknesses $E_{P1}$ and $E_{G1}$ and $E_{P2}$ and $E_{G2}$ of the profiled rubber compound elements P1 and G1 and P2 and G2, measured in the radial direction, are such that $E_{P1}$ is between 30 and 60% of $(E_{G1}+E_{P1})$ and $E_{P2}$ is between 30 and 60% of $(E_{G2}+E_{P2})$. Below 30%, the results do not show a significant effect, and above 60% it is found that, in particular uses of the tires, the improvement in the resistance to separation between plies is diminished.

Preferably, the sums of the respective thicknesses of the profiled rubber compound elements P1 and G1 and P2 and G2, measured at the end of the first ply in the radial direction, are respectively between 30% and 80% of the overall rubber compound thickness between generatrices of cords of the first and second plies and third and first plies, respectively: a thickness less than 30% does not make it possible to obtain convincing results, and a thickness greater than 80% is useless with regard to improving the resistance to separation between plies and disadvantageous from the point of view of cost.

The tests carried out with tires according to the invention have shown that, in spite of the extreme running conditions in terms of transported loads, the nature of the ground and the courses followed, the tires maintain their integrity while conventional tires display advanced deteriorations for these same running conditions.

According to a variant embodiment of the invention, the crown reinforcement comprises at least two working plies covered radially by at least one protective ply, the axial width of the radially outermost working ply being less than the width of the other two plies. According to this variant embodiment of the invention, the axially narrowest crown ply is positioned radially between the first working ply, itself adjacent to the carcass reinforcement, and the protective ply. On the one hand, the end of the axially narrowest working ply is radially opposite the radially innermost working crown ply and separated therefrom by a first profiled rubber compound element P1, itself being radially separated from the radially outer liner C1 of the axially narrowest working ply by a second profiled rubber compound element G1, such that the profiled rubber compound elements P1 and G1 and the liner C1 have respective tensile secant moduli of elasticity at 10% elongation MP1, MG1, MC1 such that MC1≧MG1>MP1. On the other hand, the end of the axially narrowest working ply is radially opposite the protective ply and separated therefrom by a third profiled rubber compound element P2, itself being radially separated from the radially inner liner C2 of the axially narrowest working ply by a fourth profiled rubber compound element G2, such that the profiled rubber compound elements P2 and G2 and the liner C2 have respective tensile secant moduli of elasticity at 10% elongation MP2, MG2, MC2 such that MC2≧MG2>MP2.

According to other variant embodiments of tires according to the invention, in particular in the case of tires intended for dumper-type vehicles for civil engineering applications, the crown reinforcement comprises at least two continuous working plies and it is supplemented on each side of the circumferential mid-plane by at least one working half-ply. According to this type of variant embodiment, the ply end considered according to the invention can be the end of a continuous ply, or the end of a half-ply, depending on the particular embodiment; specifically, the ply end radially opposite two plies distributed radially on each side of the said end can be the end of a continuous ply or of a half-ply.

According to a preferred embodiment of the invention, the crown reinforcement comprising at least four plies, apart from the first ply, the axially outer end of at least one other ply radially opposite at least one ply situated radially more outwardly or radially more inwardly is separated radially from the latter ply by a profiled rubber compound element Px, the profiled element Px being radially separated from the radially outer liner Cx of the other ply by a second profiled rubber compound element Gx and the profiled rubber compound elements Px, Gx and the liner Cx having respective tensile secant moduli of elasticity at 10% elongation MPx, MGx, MCx such that MCx≧MGx>MPx.

Preferably according to an embodiment of the invention, the axially outer end of the profiled element Px is situated at a distance from the equatorial plane of the tire which is less than the distance separating the plane from the end of the latter ply.

According to this preferred embodiment of the invention, in addition to the stacks of two profiled rubber compound elements on either side of the end of the ply radially opposite two other plies, at least one other axially outer ply end opposite a ply is separated therefrom by a stack of two profiled rubber compound elements creating a gradient of moduli of elasticity which decrease from the liner of the end to the ply radially opposite the end.

Since each of the axially outer ends can be stressed during particularly harsh running conditions, it appears that this embodiment of the invention further improves the performance of the tire in terms of durability.

Preferably, according to the latter embodiment of the invention, the thicknesses $E_{Px}$ and $E_{Gx}$ of the profiled rubber compound elements Px and Gx, measured in the radial direction, are such that $E_{Px}$ is between 30 and 60% of $(E_{Gx}+E_{Px})$.

A preferred variant of the invention provides that the end of any ply of the crown reinforcement opposite another ply situated radially more outwardly or radially more inwardly is separated radially from the latter ply by a stack of two profiled rubber compound elements creating a gradient of moduli of elasticity which decrease from the liner of the said end to the ply radially opposite the said end.

Preferably again, the invention provides that the end of any crown reinforcement ply opposite two other plies respectively situated radially more outwardly and radially more inwardly is separated radially from these two plies by stacks of two profiled rubber compound elements each creating a gradient of moduli of elasticity which decrease from the liner of the end to each of the plies radially opposite the end.

According to a preferred embodiment of the invention, the profiled rubber compound elements G1, G2, Gx have their axially inner ends situated at distances from the equatorial plane which are respectively at most equal to the distances separating the plane from the axially inner ends of the profiled rubber compound elements P1, P2, Px. According to this embodiment, the profiled rubber compound elements P1, P2, Px are not in contact with the plies whose ends are separated respectively by stacks of profiled rubber compound elements from other plies.

BRIEF DESCRIPTION OF THE DRAWINGS

Other advantageous details and features of the invention will become apparent below from the description of exemplary embodiments of the invention with reference to FIGS. 1 and 2, in which.

DETAILED DESCRIPTION OF THE DRAWINGS

To make the figures easier to understand, they are not shown to scale.

The figures show only a half-view of the tires, which extend symmetrically with respect to the axis XX', which represents the circumferential mid-plane, or equatorial plane, of a tire.

Figure 1:
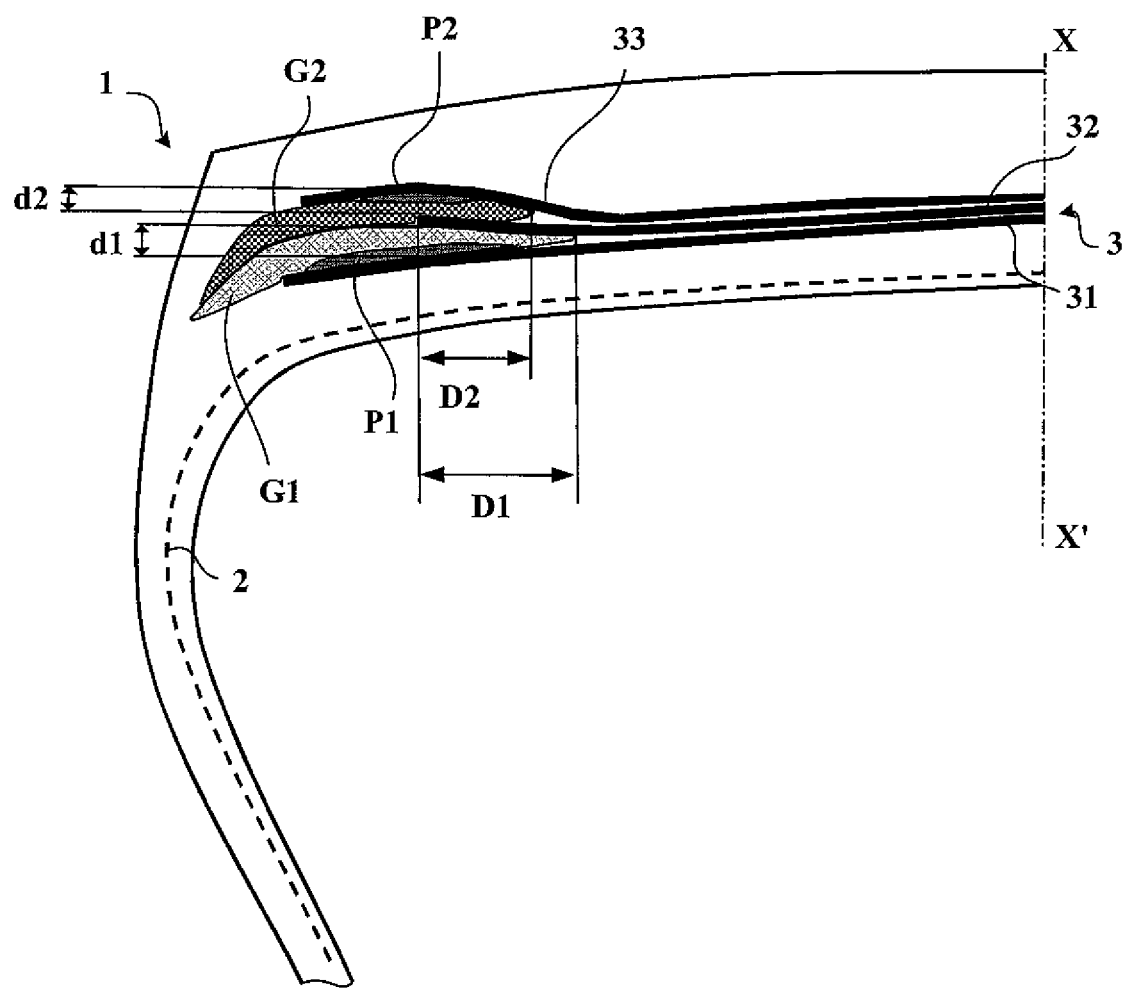
FIG. 1 shows a partial view in meridian section of a diagram of a tire according to a first embodiment of the invention.

FIG. 1 shows a partial schematic view in meridian section of a tire 1 having a size of 40.00R57.

The tire 1 comprises a radial carcass reinforcement 2 anchored in each bead; the said beads are not shown in the figures. This reinforcement is radially outwardly surmounted by a crown reinforcement 3 comprising radially, from inside to outside:

a first working crown ply 31 formed by inextensible metal cords made of steel forming an angle α1 equal to 18° with the circumferential direction, radially outside and in contact with the working crown ply 31, a rubber compound layer P1, radially outside and in contact with the rubber compound layer P1, a rubber compound layer G1, radially outside the rubber compound layer G1, a second working crown ply 32 formed by metal cords identical to those of the first ply 31 and forming, with the circumferential direction, an angle α2, opposite to the angle α1, which, in the case shown, is equal in absolute value to the said angle α1 of 18° (although it can be different from the said angle α1), radially outside the working ply 32, a rubber compound layer G2, radially outside the rubber compound layer G2, a rubber compound layer P2, radially outside the rubber compound layer P2, a protective ply 33. The protective ply 33 is a ply of metal cords made of steel which are oriented with respect to the circumferential direction by an angle α3 having the same direction as the angle α2. The width L3 of the protective ply 33 is greater than the width L2 of the working ply 32 and less than the width L1 of the working ply 31.

The liners C1 and C2 (not shown) on either side of the reinforcing elements of the working ply 32 are composed of the same rubber compound. It goes without saying that the liners could be different.

The combination of the rubber compound layers P1 and G1 provides uncoupling between the working ply 31 and the end of the radially outer working ply 32.

The axial width of the rubber compound layer P1 is chosen such that its axially outer end is axially inside the end of the ply 31.

In FIG. 1, the axially outer end of the rubber compound layer G1 is axially outside and radially inside the end of the working ply 31. According to other embodiments of the invention not shown in the figures, the axially outer end of the rubber compound layer G1 can be axially contained between the end of the working ply 31 and the axially outer end of the rubber compound layer P1.

The engagement zone of the profiled rubber compound elements P1 and G1 between the two working plies 31 and 32 is defined by the thickness or more precisely the radial distance d1 between the end of the ply 32 and the ply 31 and by the axial width D1 of the profiled rubber compound element G1 contained between the axially inner end of the said profiled rubber compound element G1 and the end of the working crown ply 32. The radial distance d1 is equal to 9 mm. The axial distance D1 is equal to 75 mm, that is to say approximately 15 times the diameter $\phi 2$ of the reinforcing elements of the working ply 32, the diameter $\phi 2$ being equal to 5 mm.

The moduli of elasticity at 10% elongation of the rubber compound layers P1 and G1 and of the liner layer C1 of the working ply 32, which are MP1 and MG1 and MC1 respectively, are chosen such that they satisfy the following relationship: MP1<MG1≦MC1. Such a construction of the tire 1 allows the stresses on the liner layer C1 to be reduced by passing through the rubber compound layer G1 in contact with the working ply 32 to the rubber compound layer P1 in contact with the working ply 31, thus making it possible to improve the resistance of the crown architecture to separation between the ends of the working plies 31 and 32.

The combination of the rubber compound layers P2 and G2 provides uncoupling between the end of the working ply 32 and the radially outer protective ply 33.

The axial width of the layer P2 is chosen such that its axially outer end is axially inside the end of the protective ply 33.

In FIG. 1, the axially outer end of the rubber compound layer G2 is axially outside the end of the protective ply 33. According to other embodiments of the invention not shown in the figures, the axially outer end of the rubber compound layer G2 can be axially contained between the end of the protective ply 33 and the axially outer end of the rubber compound layer P2.

The engagement zone of the profiled rubber compound elements P2 and G2 between the two working plies 32 and 33 is defined by the thickness or more precisely the radial distance d2 between the end of the ply 32 and the ply 31 and by the axial width D2 of the profiled rubber compound element G2 contained between the axially inner end of the said profiled rubber compound element G2 and the end of the working crown ply 32. The radial distance d2 is equal to 7 mm. The axial distance D2 is equal to 85 mm, that is to say approximately 17 times the diameter $\phi 2$ of the reinforcing elements of the working ply 32, the diameter $\phi 2$ being equal to 5 mm.

The moduli of elasticity at 10% elongation of the rubber compound layers P2 and G2 and of the liner layer C2 of the working ply 32, which are MP2 and MG2 and MC2 respectively, are chosen such that they satisfy the following relationship: MP2<MG2≦MC2. Such a construction of the tire 1 allows the stresses on the liner layer C2 to be reduced by passing through the rubber compound layer G2 in contact with the working ply 32 to the rubber compound layer P2 in contact with the protective ply 33, thus making it possible to improve the resistance of the crown architecture to separation between the ends of the plies 32 and 33.

Figure 2:
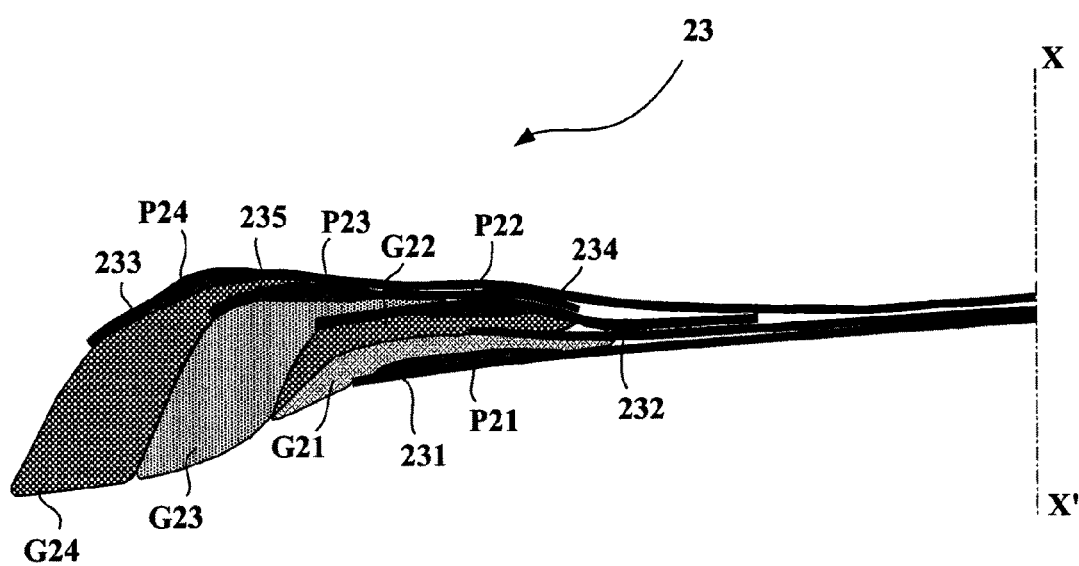
FIG. 2 shows a partial view in meridian section of a diagram of the crown reinforcement of a tire according to a second embodiment of the invention.

FIG. 2 shows a schematic view in meridian section of the crown reinforcement 23 of a tire, similar to the view shown in FIG. 1 and differing therefrom by the presence of additional working plies, particularly working plies interrupted at their centre, manifested by the presence of two working shoulder half-plies. The crown reinforcement 23 thus comprises two pairs of half-plies 234 and 235 radially outside the continuous working plies 231, 232 and radially inside the protective ply 233.

In a similar manner to the case in FIG. 1, the axially outer end of the working ply 232 is radially uncoupled from the ply 231 by the combination of the rubber compound layers P21 and G21.

As in the case of FIG. 1, the moduli of elasticity at 10% elongation of the rubber compound layers P21 and G21 and of the liner layer C21 (not shown) of the working ply 232, which are MP21 and MG21 and MC21 respectively, are chosen such that they satisfy the following relationship: MP21<MG21≦MC21.

The axially outer end of the working ply 232 is then radially uncoupled from the half-ply 234 by the combination of the layers of compounds P22 and G22.

The moduli of elasticity at 10% elongation of the rubber compound layers P22 and G22 and of the liner layer C22 (not shown) of the working ply 232, which are MP22 and MG22 and MC2 respectively, are chosen such that they satisfy the following relationship: MP22<MG22≦MC22.

The axially outer end of the half-ply 234 which comes radially opposite the half-ply 235 is itself separated from the half-ply 235 by the combination of layers of compounds P23 and G23.

The moduli of elasticity at 10% elongation of the rubber compound layers P23 and G23 and of the liner layer C23 (not shown) of the working half-ply 234, which are MP23 and MG23 and MC23 respectively, are chosen such that they satisfy the following relationship: MP23<MG23≦MC23.

The axially outer end of the half-ply 235 which comes radially opposite the protective ply 233 is itself separated from the said protective ply 233 by the combination of layers of compounds P24 and G24.

The moduli of elasticity at 10% elongation of the rubber compound layers P24 and G24 and of the liner layer C24 (not shown) of the working half-ply 235, which are MP24 and MG24 and MC24 respectively, are chosen such that they satisfy the following relationship: MP24<MG24≦MC24.

The thicknesses, axial widths and engagement zones between the plies of the various rubber compounds represented in FIG. 2 are similar to those in FIG. 1.

The crown reinforcement 23 shown in FIG. 2 has a working ply 232 whose end is on either side radially opposite two plies from which it is uncoupled by combinations of rubber compounds. In addition, other axially outer ends of other plies radially opposite at least one ply are radially uncoupled from the said at least one ply by a combination of rubber compounds. These various combinations of rubber compounds satisfy the relationships, described above, linking their respective moduli along with the modulus of the liner of the ply whose end is considered.

Running tests were carried out with these two types of tires shown in FIGS. 1 and 2 and compared with conventional tires featuring the same crown reinforcement but having a single rubber compound instead of the combinations according to the invention. The particularly harsh running conditions in terms of loads and ground nature were identical for all the tires.

An analysis of the tires after a given distance traveled revealed that the tires according to FIGS. 1 and 2 showed no adverse change while the tires of conventional designs already showed areas of cracking at the ends of certain working plies.

Although certain junctions between plies were less negatively affected from the point of view of inter-ply separation, it seems nevertheless that solutions such as those presented in FIG. 2, which provide for uncouplings by a combination of rubber compounds at different ends of plies, and if appropriate radially only on one side of certain ends, provide an additional improvement as regards the endurance properties of the tire under very harsh running conditions.

The examples illustrated in the figures are not intended to be interpreted in a limiting manner. Tires according to the invention may have a larger number of working plies and protective plies; they may also have other types of plies such as band plies, etc.

The invention should also not be understood as being limited to the presence of a combination of rubber compounds, according to the invention, at each of the axially outer ends of a ply radially opposite another ply; in other words, a tire according to the invention may have one or more axially outer ends radially opposite a ply without being uncoupled therefrom.

The invention claimed is:

1. A tire with a radial carcass reinforcement surmounted by a crown reinforcement comprising at least three plies of reinforcing elements which are parallel to one another in each ply, at least the axially outer end of a first ply being radially opposite a second ply situated radially more inwardly, and radially opposite a third ply situated radially more outwardly, wherein at least a first profiled rubber compound element P1 radially separates said second ply from at least the end of said first ply, wherein the axially outer end of said first profiled element P1 is situated at a distance from the equatorial plane of the tire which is less than the distance separating said plane from the end of said second ply, wherein said profiled element P1 is radially separated from a radially outer liner C1 of said first ply by a second profiled rubber compound element G1, wherein at least a third profiled rubber compound element P2 radially separates said third ply from at least the end of said first ply, wherein the axially outer end of said third profiled element P2 is situated at a distance from the equatorial plane of the tire which is less than the distance separating said plane from the end of the third ply, wherein said profiled element P2 is radially separated from a radially inner liner C2 of said first ply by a fourth profiled rubber compound element G2, and wherein said profiled rubber compound elements P1, P2 and GI, G2 and said liners C1, C2 have respective tensile secant moduli of elasticity at 10% elongation MP1, MP2, MG1, MG2, MC1, MC2 such that $MC1 \geqq MG1 > MP1$ and $MC2 \geqq MG2 > MP2$.

2. The tire according to claim 1, wherein a thicknesses $E_{P1}$ and $E_{G1}$ and $E_{P2}$ and $E_{G2}$ of the profiled rubber compound elements P1 and G1 and P2 and G2, measured in the radial direction, are such that $E_{P1}$ is between 30 and 60% of $(E_{G1}+E_{P1})$ and $E_{P2}$ is between 30 and 60% of $(E_{G2}+E_{P2})$.

3. The tire according to claim 1, wherein the sums of the respective thicknesses of the profiled rubber compound elements P1 and G1 and P2 and G2, measured at the end of the first ply in the radial direction, are respectively between 30% and 80% of the overall rubber compound thickness between generatrices of cords of the first and second plies and third and first plies, respectively.

4. The tire according to claim 1, wherein the crown reinforcement comprises at least two working plies covered radially by at least one protective ply, and wherein the axial width of the radially outermost working ply is less than the width of said other two plies.

5. The tire according to claim 1, wherein the crown reinforcement comprises at least two continuous working plies, and wherein the crown reinforcement is supplemented on each side of the circumferential mid-plane by at least one working half-ply.

6. The tire according to claim 1, the crown reinforcement comprising at least four plies, wherein, apart from said first ply, the axially outer end of at least one other ply radially opposite at least one ply situated radially more outwardly or radially more inwardly is separated radially from the latter ply by a profiled rubber compound element Px, wherein said profiled element Px is radially separated from a radially outer liner Cx of said other ply by a second profiled rubber compound element Gx, and wherein said profiled rubber compound elements Px, Gx and the said liner Cx have respective tensile secant moduli of elasticity at 10% elongation MPx, MGx, MCx such that $MCx \geqq MGx > MPx$.

7. The tire according to claim 6, wherein the axially outer end of said profiled element Px is situated at a distance from the equatorial plane of the tire which is less than the distance separating said plane from the end of said latter ply.

8. The tire according to claim 6, wherein a thicknesses $E_{Px}$ and $E_{Gx}$ of the profiled rubber compound elements Px and Gx, measured in the radial direction, are such that $E_{Px}$ is between 30 and 60% of $(E_{Gx}+E_{Px})$.

9. The tire according to claim 6, wherein the profiled rubber compound elements G1, G2, Gx have their axially inner ends situated at distances from the equatorial plane which are respectively at most equal to the distances separating said plane from the axially inner ends of the profiled rubber compound elements Pl, P2, Px.

* * * * *